(12) United States Patent
Dvorchak et al.

(10) Patent No.: US 9,617,444 B2
(45) Date of Patent: Apr. 11, 2017

(54) LOW GLOSS RADIATION-CURABLE COMPOSITIONS

(75) Inventors: Michael J. Dvorchak, Monroeville, PA (US); Charles A. Gambino, McDonald, PA (US); Charles Todd Williams, Pittsburgh, PA (US)

(73) Assignee: ALLNEX IP S.a.r.L., Luxembourg (LU)

( * ) Notice: Subject to any disclaimer, the term of this patent is extended or adjusted under 35 U.S.C. 154(b) by 57 days.

(21) Appl. No.: 13/698,313

(22) PCT Filed: May 19, 2011

(86) PCT No.: PCT/US2011/000890
§ 371 (c)(1),
(2), (4) Date: Jan. 8, 2013

(87) PCT Pub. No.: WO2011/146123
PCT Pub. Date: Nov. 24, 2011

(65) Prior Publication Data
US 2013/0202808 A1 Aug. 8, 2013

Related U.S. Application Data

(60) Provisional application No. 61/346,950, filed on May 21, 2010.

(51) Int. Cl.
*C08F 2/50* (2006.01)
*C09D 133/14* (2006.01)
*C09D 175/16* (2006.01)

(52) U.S. Cl.
CPC ......... *C09D 133/14* (2013.01); *C09D 175/16* (2013.01)

(58) Field of Classification Search
CPC ...... B05D 3/067; B05D 5/02; B05D 2401/10; C08F 2/48; C08G 18/672; C08G 18/673; C08G 18/8175; C09D 7/001; C09D 7/005; C09D 7/1216; C09D 175/16
USPC .................................. 427/508, 517
See application file for complete search history.

(56) References Cited

U.S. PATENT DOCUMENTS

| | | | |
|---|---|---|---|
| 3,124,605 A | 3/1964 | Wagner | |
| 3,183,112 A | 5/1965 | Gemassmer | |
| 3,919,218 A | 11/1975 | Schmitt et al. | |
| 4,110,317 A * | 8/1978 | Moraveck | 528/77 |
| 4,324,879 A | 4/1982 | Bock et al. | |
| 4,380,604 A | 4/1983 | Neuhaus et al. | |
| 4,937,173 A | 6/1990 | Kanda et al. | |
| 5,013,631 A | 5/1991 | Su | |
| 5,213,875 A | 5/1993 | Su et al. | |
| 5,362,773 A | 11/1994 | Brindoepke et al. | |
| 6,011,078 A | 1/2000 | Reich et al. | |
| 6,232,360 B1 | 5/2001 | Meixner et al. | |
| 6,479,577 B1 | 11/2002 | Paulus et al. | |
| 6,509,389 B1 | 1/2003 | Krohn | |
| 6,521,702 B1 | 2/2003 | Weikard et al. | |
| 6,538,044 B2 | 3/2003 | Ledniczky et al. | |
| 6,541,536 B2 | 4/2003 | Weikard et al. | |
| 6,559,225 B1 | 5/2003 | Irle et al. | |
| 6,579,932 B1 | 6/2003 | Schipper et al. | |
| 6,753,394 B2 | 6/2004 | Weikard et al. | |
| 6,790,485 B2 | 9/2004 | Baumbach et al. | |
| 2003/0045596 A1 | 3/2003 | Krohn | |
| 2003/0045598 A1 | 3/2003 | Chen et al. | |
| 2003/0059555 A1 | 3/2003 | Fenn et al. | |
| 2005/0095371 A1 | 5/2005 | Braun | |
| 2005/0271881 A1* | 12/2005 | Hong | 428/423.1 |
| 2006/0229426 A1* | 10/2006 | Roesler et al. | 528/75 |

FOREIGN PATENT DOCUMENTS

| | | |
|---|---|---|
| EP | 0798299 B1 | 8/2003 |
| EP | 15 41 649 A1 | 11/2004 |
| WO | 01/74499 A1 | 10/2001 |

* cited by examiner

*Primary Examiner* — Robert S Walters, Jr.

(57) ABSTRACT

A method of coating a substrate is disclosed in which a non-aqueous composition is applied to the substrate and then exposed to UV-A light until the composition is substantially cured. The non-aqueous composition comprises an unsaturated (meth)acrylate polymer or oligomer, reactive diluents, one or more photoinitators, an optional solvent or mixture of solvents, and up to 15% by weight of a flattener. A coating is formed having an 85° gloss of less than 15.

9 Claims, No Drawings

LOW GLOSS RADIATION-CURABLE COMPOSITIONS

BACKGROUND OF THE INVENTION

High-solids very low gloss coatings (i.e., 85 degree gloss less than 15) are difficult to formulate in oligomeric UV curable coatings due to the lack of shrinkage. Flatteners can be used at levels of greater than five parts per hundred resin to approach the aforementioned gloss levels, however, at these flattener levels the coatings viscosity increases rapidly and the coating's surface is prone to marring. The present invention utilizes relatively high levels of low molecular weight monomers, low percentages of large particle size flatteners (e.g., silica, polymeric particles), and a UV-A light source to produce very low gloss levels. The film's high surface roughness is formed by a combination of oxygen inhibition retarding the coating's surface cure and the flatteners, and the coating forms a hard, non-tacky surface. The lower flattener levels are advantageous as compared to high levels of flatteners because it allows the coating to display lower viscosity, flexibility and chemical resistance.

UV curable coating compositions are known in the art. U.S. Pat. No. 5,684,081 describes a radiation-curable, aqueous dispersion, although the reference is silent as to the wavelength of the radiation to be used. Also known are compositions that are curable using UV radiation having a very low UV-B content and substantially no UV-C content (see, e.g., U.S. Patent Application Publication No. 2003/0059555 and U.S. Pat. No. 6,538,044). The compositions described in the '044 patent are fragranced lacquer coatings that are non-aqueous and are not based on urethane chemistry. The '555 publication describes solvent-based compositions useful as primers. The compositions therein are non-aqueous and require wiping of the coating with an organic solvent following exposure to UV radiation and before sanding of the coated part.

U.S. Pat. No. 6,559,225 describes an aqueous polyurethane dispersion for use in lacquers and coatings. The '225 patent does not describe UV curing, and hints that the dispersions described therein can be combined with radiation-curable binders (column 5, lines 17-20). U.S. Pat. No. 6,579,932 describes an aqueous coating composition which is a mixture of a polyurethane/acrylate hybrid dispersion and a polyurethane resin with oxidative drying groups. The '932 patent does not describe UV curing.

Aqueous radiation curable dispersions are also known (see, e.g., U.S. Pat. Nos. 5,362,773, 6,011,078, 6,479,577, 6,521,702 and 6,541,536).

Non-aqueous, radiation curable compositions are also known. WO 01/74499 describes a primer composition containing one or more compounds containing two or more ethylenically unsaturated polymerizable groups per molecule. Among the compounds described are epoxy acrylates, urethane acrylates and unsaturated polyesters. The compositions described therein also require significant amounts of relatively low molecular weight materials (such as ethylhexyl acrylate and isobornyl methacrylate). The '499 publication indicates that the compositions described therein can be cured with UV radiation using UV lamps having a UV-B:UV-A ratio of 1:1 or less and substantially no UV-C content. As in the '555 publication noted above, the compositions require wiping of the coating with an organic solvent following exposure to UV radiation and before sanding of the coated part. Similar compositions are described in published U.S. Patent Application Publication Nos. 2003/0045598 and 2003/045596, and U.S. Pat. Nos. 4,937,173, 5,013,631, 5,213,875 and 6,509,389.

Radiation curable urethane acrylates are also described in U.S. Pat. Nos. 4,380,604, 6,232,360, 6,753,394 and 6,790,485.

SUMMARY OF THE INVENTION

The present invention involves a method of coating a metal substrate comprising
1) applying a non-aqueous composition to the substrate, wherein the non-aqueous composition comprises
   A) an unsaturated (meth)acrylate polymer or oligomer consisting of:
      a) an unsaturated urethane (meth)acrylate polymer or oligomer, and is prepared by reacting:
         ai) one or more organic polyisocyanates, and
         aii) one or more —NH or —OH functional compounds having a number average molecular weight of from about 60 to about 600, and
         aiii) 1) from 0 to about 100% by weight of a mono-, di-, tri- or poly-hydroxyl-$C_1$-$C_{10}$-alkyl or $C_6$-$C_{10}$-aryl (meth)acrylate,
         2) from 0 to 100% by weight of an unsaturated polyether or polyester (meth)acrylate polyol having an OH number of from about 30 to about 500 and prepared by reacting a polyether or polyester di- or polyol with acrylic and/or methacrylic acid, and
         3) or the combination of aiii) 1) and aii)2) wherein the percents by weight of components aiii)1), aiii)2) are based on the total weight of components aiii)1) and aiii)2 and total 100%, at an isocyanate to hydroxyl equivalent ratio of from about 0.9:1 to about 1:0.9,
   B) from 15 to about 200% by weight of reactive diluents selected from a mono-, di-, tri- or poly —$C_1$-$C_{10}$-alkyl or $C_6$-$C_{10}$-aryl {(meth) acrylates} or vinyl ethers or their mixtures,
   C) from about 0.1 to about 10% by weight of one or more photoinitiators,
   D) from 0 to about 90% by weight of solvent or a mixture of solvents, and
   E) up to about 15% by weight of a flattener;
wherein the weight % of components B), D) and E) are each individually based on the amount of component A), and
2) exposing the coating composition to UV-A light until the composition is substantially cured.

DETAILED DESCRIPTION OF THE PREFERRED EMBODIMENTS

As used herein and in the claims, the term "molecular weight" or MW refers to number average molecular weight.

More particularly, the present invention is directed to a process of producing a low gloss coating by utilizing a composition comprising one or more urethane acrylates and a substantial amount of monomeric acrylate, and curing the composition using UV-A light. The composition is cured until any oxygen-inhibited surfaces are fully cured.

The compositions of the present invention are non-aqueous compositions comprising
A) an unsaturated (meth)acrylate polymer or oligomer consisting of:
   a) an unsaturated urethane (meth)acrylate polymer or oligomer, and is prepared by reacting:
      ai) one or more organic polyisocyanates, and aii) one or more —NH or —OH functional compounds having a number average molecular weight of from about 60 to about 600, and aiii) 1) from 0 to about 100% by weight, preferably from about 10 to about 90% by weight, and most preferably from about 25 to about 75% by weight, of a mono-, di-, tri- or poly-hydroxyl-$C_1$-$C_{10}$-alkyl or $C_1$-$C_{10}$-aryl (meth)acrylate, 2) from 0 to 100% by weight of an unsaturated polyether or polyester (meth)acrylate polyol having an OH number of from about 30 to about 500 (preferably from about 100 to about 400 and most preferably from about 100 to about 300), and prepared by reacting a polyether di- or polyol with acrylic and/or methacrylic acid, and 3) or the combination of aiii) 1) and aii)2) wherein the percents by weight of components aiii)1), aiii)2) are based on the total weight of components aiii)1) and aiii)2 and total 100%, at an isocyanate to hydroxyl equivalent ratio of from about 0.9:1 to about 1:0.9 (and preferably about 1:1), B) from 40 to about 200% by weight, preferably from about 50 to about 150% by weight, and most preferably from about 75 to about 125% by weight, of reactive diluents selected from a mono-, di-, tri- or poly-$C_1$-$C_{10}$-alkyl or $C_6$-$C_{10}$-aryl {(meth) acrylates} or vinyl ethers or their mixtures, C) from about 0.1 to about 10% by weight, preferably from about 0.5 to about 6% by weight, and most preferably from about 1 to about 4% by weight, of one or more photoinitiators, and D) from 0 to about 90% by weight of solvent or a mixture of solvents, and E) up to about 15% by weight of a flattening agent; wherein the weight % of components B), C), D) and E) are all based on the amount of component A).

Component A)

Useful urethane (meth)acrylates are described in U.S. Pat. Nos. 4,380,604 and 6,753,394. Such urethane (meth)acrylates are generally prepared by reacting one more polyisocyanates with an hydroxyl group-containing unsaturated (meth)acrylate. While one urethane (meth)acrylate may be used, mixtures of more than one urethane (meth)acrylate may also be used.

Suitable polyisocyanates include organic polyisocyanates having aliphatically, cycloaliphatically and/or aromatically bound isocyanate groups and generally having molecular weights of from about 144 to about 1000, more preferably from about 168 to about 300. Suitable examples include butylene diisocyanate, hexamethylene diisocyanate (HTI), isophorone diisocyanate (IPDI), 3(4)-isocyanatomethyl-methylcyclohexyl isocyanate (IMCI), trimethylhexamethylene diisocyanate (2,2,4 and/or 2,4,4-trimethyl-hexamethylene diisocyanate), the isomeric bis(4,4'-isocyanato-cyclohexyl)methanes ($H_{12}$MDI), the isomeric bis(isocyanate-methyl)-methylcyclohexanes, isocyanatomethyl-1,8-octane diisocyanate, 1,4-cyclohexylene diisocyanate, 1,4-phenylene diisocyanate, 2,4- and/or 2,6-toluylene diisocyanate (TDI), 1,5-naphthylene diisocyanate, 2,4'- and/or 4,4'-diphenylmethane diisocyanate (MDI), triphenylmethane-4,4',4"-triisocyanate or their derivatives having a urethane, isocyanurate, allophanate, biuret, uretdione, iminooxadiazinedione structure and/or mixtures thereof as well as mixtures of aliphatic and aromatic diisocyanates and/or polyisocyanates. The production of such derivatives is known and described, for example, in U.S. Pat. Nos. 3,124,605, 3,183,112, 3,919,218, and 4,324,879 and in EP 798 299.

Preferably used are HDI, IPDI, TDI, $H_{12}$MDI and/or isocyanurate group-containing polyisocyanates obtained by trimerization of HDI, TDI or IPDI. Particularly preferred are HDI and IPDI and mixtures thereof.

The —NH and —OH functional compounds useful herein as component aii) have number average molecular weights of from about 60 to about 600 and preferably from about 60 to about 200. Specifically useful —OH functional compounds include ethylene glycol; diethylene glycol; triethylene glycol; propylene glycol; dipropylene glycol; butane diols; hexane dials; glycerin; trimethylolethane; trimethylolpropane; pentaerythritol; hexane triols; mannitol; sorbitol; glucose; fructose; mannose; sucrose; and propoxylated and/or ethoxylated adducts of any of the above-noted hydroxy functional materials having number average molecular weights of up to about 600.

Suitable —NH functional compounds include, for example, ethylene diamine, 1,2-diaminopropane, 1,4-diaminobutane, 1,6-diaminohexane, 2,5-dimethylhexane, 2,2, 4- and/or 2,4,4-trimethyl-1,6-diaminohexane, 1,11-diaminoundecane, 1,12-diaminododecane, 1-amino-3,3,5-trimethyl-5-aminomethyl-cyclohexane, 2,4- and/or 2,6-hexahydrotoluyiene diamine, 2,4'- and/or 4,4'-diamino-dicyclohexyl methane and 3,3'-dimethyl-4,4'-diamino-dicyclohexyl methane. Aromatic polyamines such as 2,4- and/or 2,6-diaminotoluene and 2,4'- and/or 4,4'-diaminodiphenyl methane are also suitable but less preferred. Relatively high molecular weight polyether polyamines containing aliphatically bound primary amino groups, for example, the products marketed under the Jeffamine trademark by Texaco, are also suitable.

In preparing the unsaturated urethane (meth)acrylate, the polyisocyanate is reacted at an isocyanate to OH equivalent ratio of from 0.5:1 to 1:0.5, preferably about 0.9:1 to about 1:0.9, and more preferably about 1:1, with i) an unsaturated polyether (meth)acrylate having an OH number of from about 30 to about 300, ii) a mono-, di-, tri-, or polyhydroxyl $C_1$ to $C_{10}$-alkyl or $C_6$ to $C_{10}$-aryl (meth)acrylate, or iii) a mixture thereof.

Useful unsaturated polyether (meth)acrylates are prepared by reacting a polyether polyol (having a hydroxyl functionality of from 2 to 6) with acrylic and/or methacrylic acid. Suitable polyether polyols are of the type known in the polyurethane art and are generally prepared by reacting a suitable staring molecule such as, e.g., ethylene glycol, propylene glycol, butanol, glycerol, trimethylol propane, hexane diol, pentaerythritol and the like with ethylene oxide, propylene oxide or a mixture thereof. The polyether is then reacted with acrylic and/or methacrylic acid. When the unsaturated (meth)acrylate is to be used to prepare the unsaturated urethane (meth)acrylate, the polyether is selected so as to produce the (meth)acrylate having the required OH number and the components are reacted in amounts such that the resultant unsaturated polyether (meth)acrylate has an OH number of from about 30 to about 500, preferably from about 100 to about 400 and most preferably from about 100 to about 300. In the case where the unsaturated (meth)acrylate is to be used as an part or all of component A), the polyether is selected so as to produce the (meth)acrylate having the required OH number and the polyether and acrylic (and/or methacrylic) acid are reacted in amounts such that the resultant unsaturated polyether (meth)acrylate has an OH number of from about 30 to about 500, preferably from about 100 to about 400 and most preferably from about 100 to about 300.

Useful unsaturated polyester (meth)acrylates are prepared by reacting a polyester polyol (having a hydroxyl functionality of from 2 to 6) with acrylic and/or methacrylic acid. Suitable polyester polyols are of the type known in the polyurethane art and are generally prepared by reacting a suitable staring glycols such as, e.g., ethylene glycol, propylene glycol, butanol, glycerol, trimethylol propane, hexane diol, pentaerythritol and the like with diacids or anhydrides (such as adipic, fumaric, maleic, terephthalic, isophthalic, phthalic and the like, or a mixture thereof. The polyester polyol is then reacted with acrylic and/or methacrylic acid. When the unsaturated (meth)acrylate is to be used to prepare the unsaturated urethane (meth)acrylate, the polyester is selected so as to produce the (meth)acrylate having the required OH number and the components are reacted in amounts such that the resultant unsaturated polyester (meth)acrylate has an OH number of from about 30 to about 500, preferably from about 100 to about 400 and most preferably from about 100 to about 300. In the case where the unsaturated (meth)acrylate is to be used as an part or all of component A), the polyester is selected so as to produce the (meth)acrylate having the required OH number and the polyester and acrylic (and/or methacrylic) acid are reacted in amounts such that the resultant unsaturated polyester (meth) acrylate has an OH number of from about 30 to about 500, preferably from about 100 to about 400 and most preferably from about 100 to about 300.

Useful mono-, di-, tri-, or polyhydroxyl $C_1$ to $C_{10}$-alkyl or $C_6$ to $C_{10}$-aryl (meth)acrylates are also known in the polyurethane art. Such material are prepared by reacting relatively low molecular weight diols, triols and polyols (such as ethylene glycol, propylene glycol, butanol, glycerol, trimethylol propane, hexane diol, pentaerythritol and the like) with acrylic and/or methacrylic acid in amounts such that the resultant product contains one or more hydroxyl groups. Specific examples include hydroxyethyl acrylate, hydroxypropyl acrylate, hydroxybutyl acrylate, hydroxypropyl acrylate, hydroxyhexyl acrylate, triglycerol diacrylate, dipentaerythritol pentaacrylate, and the corresponding methacrylates.

Component B

The compositions of the present invention can also contain one or more reactive diluents in an amount of from 15 to about 50% by weight, where the % by weight is based on the amount of component A). The reactive diluents are selected from the group from 40 to about 200% by weight, preferably from about 50 to about 150% by weight, and most preferably from about 75 to about 125% by weight, of reactive diluents selected from a mono-, di-, tri- or poly- $C_1$-$C_{10}$-alkyl or $C_6$-$C_{10}$-aryl {(meth) acrylates} or vinyl ethers or their mixtures. Also suitable are (meth)acrylates with acid functionality to promote adhesion.

Component C

Component C), the photoinitiator, can be substantially any photoinitiator. A variety of photoinitiators can be utilized in the radiation-curing compositions of the present invention. The usual photoinitiators are the type that generate free radicals when exposed to radiation energy. Suitable photoinitiators include, for example, aromatic ketone compounds, such as benzophenones, alkylbenzophenones, Michlers ketone, anthrone and halogenated benzophenones. Further suitable compounds include, for example, 2,4,6-trimethylbenzoyldiphenylphosphine oxide, phenylglyoxylic acid esters, anthraquinone and the derivatives thereof, benzil ketals and hydroxyalkylphenones. Illustrative of additional suitable photoinitiators include 2,2-diethoxyacetophenone; 2- or 3- or 4-bromoacetophenone; 3- or 4-allyl-acetophenone; 2-acetonaphthone; benzaldehyde; benzoin; the alkyl benzoin ethers; benzophenone; benzoquinone; 1-chloro-anthraquinone; p-diacetyl-benzene; 9,10-dibromoanthracene 9,10-dichloroanthracene; 4,4-dichlorobenzophenone; thioxanthone; isopropyl-thioxanthone; methylthioxanthone; α,α, α-trichloro-para-t-butyl acetophenone; 4-methoxybenzophenone; 3-chloro-8-nonylxanthone; 3-iodo-7-methoxyxanthone; carbazole; 4-chloro-4'-benzylbenzophenone; fluoroene; fluoroenone; 1,4-naphthylphenylketone; 1,3-pentanedione; 2,2-di-sec.-butoxy acetophenone; dimethoxyphenyl acetophenone; propiophenone; isopropylthioxanthone; chlorothioxanthone; xanthone; maleimides and their derivatives; and mixtures thereof. There are several suitable photoinitiators commercially available from Ciba including Irgacure® 184 (1-hydroxy-cyclohexyl-phenyl-ketone), Irgacure® 819 (bis (2,4,6-trimethylbenzoyl)-phenylphosphineoxide), Irgacure® 1850 (a 50/50 mixture of bis(2,6-dimethoxybenzoyl)-2,4,4-trimethylpentyl-phosphine oxide and 1-hydroxy-cyclohexyl-phenyl-ketone), Irgacure® 1700 (a 25/75 mixture of bis(2,6-dimethoxybenzoyl)-2,4,4-trimethylpentyl-phosphine oxide and 2-hydroxy-2-methyl-1-phenyl-propan-1-one), Irgacure® 907 (2-methyl-1[4-(methylthio)phenyl]-2-morpholonopropan-1-one), Darocur® MBF (a phenyl glyoxylic acid methyl ester), Irgacure® 2022 Photoinitiator blend (20% by weight of phenylbis(2,3,6-trimethyl benzoyl)phosphine oxide and 80% by weight of 2-hydroxy-2-methyl-1-phenyl-1-propanone) and Darocur® 4265 (a 50/50 mixture of bis(2,4,6-trimethylbenzoyl)-phenylphosphineoxide and 2-hydroxy-2-methyl-1-phenyl-propan-1-one). The foregoing lists are meant to be illustrative only and are not meant to exclude any suitable photoinitiators. Those skilled in the art will know the concentrations at which photoinitiators are effectively employed and generally the concentration will not exceed about 10% by weight of the radiation-curable coating composition.

Those skilled in the art of photochemistry are fully aware that photoactivators can be used in combination with the aforementioned photoinitiators and that synergistic effects are sometimes achieved when such combinations are used. Photoactivators are well known in the art and require no further description to make known what they are and the concentrations at which they are effective. Nonetheless, one can mention as illustrative of suitable photoactivators, methylamine, tributylamine, methyldiethanolamine, 2-aminoethylethanolamine, allylamine, cyclohexylamine, cyclopentadienylamine, diphenylamine, ditolylamine, trixylylamine, tribenzylamine, n-cyclohexylethyleneimine, piperidine, N-methylpiperazine, 2,2-dimethyl-1,3-bis(3-N-morpholinyl)-propionyloxypropane, and mixtures thereof.

Curing may also take place in the presence of compounds that generate free radicals such as (hydro)peroxides, optionally in the presence of accelerators and cationically in the presence of superacids such as the phenyl sulfonium metal salts.

Component D

The compositions of the present invention can also contain one or more solvents in an amount of from 0 to about 90% by weight, where the % by weight is based on the total combined amounts of components A) and B). The solvent must be inert with any and all of the other components. Useful solvents include $C_5$-$C_8$ aliphatic and cycloaliphatic compounds, fluorinated and/or chlorinated hydrocarbons, aliphatic esters, aliphatic ethers and ketones and known aromatic solvents. Specific examples of useful solvents include ethyl acetate, butyl acetate, toluene, hexane, heptane, cyclohexane, acetone, methyl ethyl ketone, methyl isobutyl ketone, methyl n-amyl ketone, isopropanol, ethylene glycol monobutyl ether, diethylene glycol monobutyl ether and solvent naptha. The formulations with or without solvents can also be loaded into aerosol containers.

The coating prepared using the process described above can be applied by conventional spray application and cured using radiation sources. This direct-to-metal coating does not need primers and has excellent adhesion to various metal substrates like cold-rolled steel, sand-blasted steel, new or weathered galvanized steel, aluminum and metal alloys. Moreover this coating could also act as a tie-coat for topcoats that have difficulty adhering to metal substrates.

Component E

The compositions of the present invention may also contain one or more flattening agents, up to about 3.5% by weight. Such flattening agents are well known to those skilled in the art. Examples of suitable flattening agents include, but are not limited to Ultramatte® 76, available from Shamrock Technologies, Inc. and silicas such as Acematte OK 412 available from Evonik Industries.

Other Additives

As is known in the art and depending on the application for the coating, additional additives can be used. Such additives include dispersing agents, flow aid agents, thickening agents, defoaming agents, deaerating agents, pigments, fillers, extenders and wetting agents. By example, pigments may include black iron oxide, titanium dioxide, carbon black, red iron oxide, zinc oxide. Also by example, extenders may include talc, calcium carbonate, wollastonite, barium sulfite, calcium silicate. In addition, where the article to be coated is of such a shape that portions of the coating may not be exposed to radiation, it is possible to add materials which crosslink through carboxyl, hydroxyl, amino groups or moisture. Such materials include carbodiimides, aziridines, polyvalent cations, melamine/formaldehyde, epoxies, and isocyanates. When used, such crosslinkers should be used in an amount of from 0.1 to 35% by weight based on the combined weight of components A) and B).

Applying and Curing

Generally, components A) and B) are first mixed together and then component C), D), and any other additives are added thereto. The composition of the invention may be applied onto the most varied substrates by spraying, rolling, knife-coating, pouring, brushing, dipping, putty knife or squeegee. Any solvent present may be then flashed off in an ambient environment or by baking in a conventional oven at a temperature of from about 20 to about 110° C. preferably from about 35 to about 60° C. for period of from about 1 to about 10 minutes preferably from about 4 to 8 minutes. The solvent can also be flashed off using radiation sources like infra-red or microwave.

Once the solvent is flashed off or has baked off to a suitable level, the coated substrate is subjected to UV-A radiation having a wavelength between 315 nm and 450 nm. The distance between the surface and the radiation source will depend upon the intensity of the light source. The length of time the coated substrate is subjected to the radiation will depend on the intensity and wavelength of the radiation, the distance from the radiation sources, solvent content in the formulation, temperature and the humidity of the cure surroundings but will generally be less than 15 minutes and may be as short as 0.1 second.

The cured coatings are distinguished by their low gloss levels.

As noted above, the compositions are also curable using radiation sources having wavelengths of from about 315 to about 420 nm. The radiation can be provided by any suitable source such as UV lamps having with or reduced infrared emission or UV lamps fitted with filters to eliminate infrared emissions or so-called LEDs (light-emitting devices) emitting radiation in the wavelength noted. Particularly useful commercially available devices include: the Fusion and Nordson high-intensity microwave powered lamps (mercury, iron doped and gallium doped lamps), high-intensity standard arc lamps, the Panacol UV H-254 lamp (available from Panacol-Elosol GmbH)—a 250 W ozone-free, iron doped metal halide lamp with spectral wavelength of from 320 to 450 nm; Panacol UVF-450 (320 nm to 450 nm depending on the black, blue or clear filter used); Honle UVA HAND 250 CUL (available from Honle UV America Inc)—emitting maximum intensity UVA range of −320 to 390 nm; PMP 250 watt metal halide lamp (available from Pro Motor Car Products Inc); Cure-Tek UVA-400 (available from H&S Autoshot) which has a 400-watt metal halide bulb and the lamp assembly can be fitted with different filters like blue, light blue or clear to control/eliminate the infra-red radiation from the lamp source); Con-Trol-Cure Scarab-250 UV-A shop lamp system (available from UV Process Supply Inc—has a 250 W iron doped metal halide lamp with a spectral wavelength output of 320 to 450 nm); Con-Trol-Cure—UV LED Cure-All 415 (available from UV Process Supply Inc.—spectral wavelength of 415 nm with a 2.5 to 7.95 W operating wattage range); Con-Trol-Cure—UV LED Cure-All 390 (available from UV Process Supply Inc.—spectral wavelength of 390 nm with a 2.76 to 9.28 W operating wattage range); UV H253 UV lamp (available from UV Light Technologies—the unit contained a 250 W iron doped metal halide lamp fitted with a black glass filter to produce a spectral wavelength of between 300 and 400 nm); Radion RX10 module curing using solid state high intensity UV light source from Phoseon Technology; Low intensity microwave UV System Model QUANT-18/36 (available from Quantum Technologies—UV Intensity range: 3-30 mW/cm2; UV Spectral range: 330-390 nm, also 60 W fluorescent bulbs); WorkLED (available from lnretech Technologies using 400 nm LED arrays); Flashlight MC with 20×LED adapter (available from Inretech Technologies using 400 nm LEDs); and Phillips TL03 lamp with radiation output above 380 nm; and sunlight.

EXAMPLES

The examples that follow are intended to illustrate the invention without restricting its scope. Unless otherwise indicated, all percentages and parts are by weight.

In the examples, the following materials were used:

Desmolux® XP 2491: unsaturated aliphatic urethane acrylate available from Bayer MaterialScience LLC.

Desmolux® U 680H: unsaturated aliphatic urethane acrylate available from Bayer MaterialScience LLC.

Disperbvk® 111: phosphorated polyester copolymer dispersant available from Byk Chemie GmbH.

Barytes Sparmite No. 1: extender pigment barium sulphate from Elementis Pigments, Inc.

Irgacure® 184: photoinitiator, 1-Hydroxy-cyclohexyl-phenyl-ketone available from Ciba Specialty Chemicals.

Irgacure® 819: photoinitiator, {Phenyl bis (2,4,6-trimethyl benzoyl) phosphine oxide} available from Ciba Specialty Chemicals.

Bayferrox® 318M: an iron oxide pigment available from Bayer Material Science LLC.

Ultramatte® 76: polyurea powder flattening agent available from Shamrock Technologies, Inc.

Example 1

19.39 parts by weight of tert.-butyl acetate was mixed with 1.64 parts by weight Irgacure® 184 and 0.82 parts by weight Irgacure® 819 at room temperature, and this mixture was heated in an oven at 60° C. for one hour to obtain a homogeneous solution. A resin solution was made by mixing 10.03 parts by weight of Desmolux® U 680H together with 10.28 parts by weight Desmolux® XP 2491, 16.59 parts by weight isobornyl acrylate, 2.34 parts by weight lauryl acrylate, 2.34 parts by weight 2-2-(ethoxyethoxy) ethyl acrylate, 3.00 parts by weight Disperbyk® 111, and 0.088 parts by weight BYK-306, and stirred until a homogeneous mixture was obtained. A pigment/flattener blend was made by mixing 6.86 parts by weight Bayferrox® 318M with 20.97 parts by weight Sparmite Barytes Number 1, and 2.60 parts by weight Ultramatte® 76. The above resin solution, pigment/flattener blend, and half of the photoinitiator solution was sheared with a Teflon blade for one hour using a Dispermat® and glass beads to grind the pigment. The formulation was de-aerated overnight.

The coating was applied to a 2024-T3 aluminum panel that had been primed four hours previously using Deft 02-Y40B primer. An Anest Iwata LPH-400 spray gun was used to apply the UV curable coating to the primed aluminum panel at 4 mills wet film thickness, and 15 minutes was allotted for the solvent to flash off. After the flash period, the formulation was cured using a H & S Autoshot UV-A light at a distance of 10 inches for a period of 8 minutes. The resulting coating had a dry film thickness of 1.8-2.0 mills, and had a 60 degree gloss of 2 and an 85 degree gloss of 5. A crosshatch adhesion rating of 5B (ASTM D 3359) was obtained to non-treated aluminum, and the coating displayed greater than 100 methyl ethyl ketone double rubs. The coating's flexibility was rated at 20 percent elongation by the G.E. flexibility test (ASTM D 6905). The coating did not exhibit blisters and delamination after soaking the panel in Skydrol for 24 hours.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:
1. A method of coating a substrate comprising
   1) applying a non-aqueous composition to the substrate, wherein the nonaqueous composition comprises
   A) an unsaturated (meth)acrylate polymer or oligomer prepared by reacting:
      ai) one or more organic polyisocyanates, and
      aii) one or more —NH functional compounds selected from the group consisting of 1,2-diaminopropane, 1,4-diaminobutane, 1,6-diaminohexane, 2,5-dimethylhexane, 2,2,4- and/or 2,4,4-trimethyl-1,6-diaminohexane, 1,11-diaminoundecane, 1,12-diaminododecane, 1-amino-3,3,5-trimethyl-5-aminomethylcyclohexane, 2,4- and/or 2,6-hexahydrotoluyiene diamine, 2,4'- and/or 4,4'-diaminodicyclohexyl methane, 3,3'-dimethyl-4,4'-diaminodicyclohexyl methane, 2,4- and/or 2,6-diaminotoluene and 2,4'- and/or 4,4'-diaminodiphenyl methane, and
      aiii) 1) from 0 to about 100% by weight of a mono-, di-, tri- or poly-hydroxyl-$C_1$-$C_{10}$-alkyl or $C_6$-$C_{10}$-aryl (meth)acrylate,
      2) from 0 to 100% by weight of an unsaturated polyether or polyester (meth)acrylate polyol having an OH number of from about 30 to about 500 and prepared by reacting a polyether or polyester di- or polyol with acrylic and/or methacrylic acid, or
      3) a combination of 1) and 2) wherein the percents by weight of components 1) and 2) are based on the total weight of components 1) and 2) and total 100%,
   at an isocyanate to hydroxyl equivalent ratio of from about 0.9:1 to about 1:0.9,
   B) from about 40 to about 200% by weight of reactive diluents selected from a mono-, di-, tri- or poly $C_1$-$C_{10}$-alkyl or $C_6$-$C_{10}$-aryl{(meth) acrylates} or vinyl ethers or their mixtures,
   C) from about 0.1 to about 10% by weight of one or more photoinitiators,
   D) from 0 to about 90% by weight of solvent or a mixture of solvents, and
   E) up to about 15% by weight of a flattener;
   wherein the weight % of components B), C), D) and E) are all based on the amount of component A), and
   2) exposing the coating composition to UV-A light until the composition is substantially cured to form a coating having an 85° gloss of less than or equal to 15.

2. The method of claim 1, wherein the one or more —NH functional compounds have a number average molecular weight of from about 60 to about 600.

3. The method of claim 1, wherein the ai) one or more organic polyisocyanates are selected from the group consisting of hexamethylene diisocyanate (HDI), isophorone diisocyanate (IPDI), 2,4- and/or 2,6-toluylene diisocyanate (TDI), isomeric bis (4,4'-isocyanato-cyclohexyl)methane ($H_{12}$MDI) and an isocyanurate group-containing polyisocyanate obtained by trimerization of HDI, TDI or IPDI.

4. The method of claim 1, wherein the coating displays greater than 100 methyl ethyl ketone double rubs.

5. The method of claim 1, wherein the coating does not blister or delaminate after the substrate is soaked in Skydrol for 24 hours.

6. The method of claim 1, wherein the substrate comprises 2024-T3 aluminum.

7. The method of claim 1, wherein B) is from about 75 to about 125% by weight of reactive diluents selected from a mono-, di-, tri- or poly $C_1$-$C_{10}$-alkyl or $C_6$-$C_{10}$-aryl{(meth) acrylates} or vinyl ethers or their mixtures.

8. The method of claim 1, wherein E) is up to about 3.5% by weight of a flattener.

9. The method of claim 1, wherein in step 2) the coating composition is exposed to UV-A light until the composition is substantially cured to form a coating having an 85° gloss of less than or equal to 5.

* * * * *